United States Patent
Kaneda et al.

(10) Patent No.: US 10,505,432 B2
(45) Date of Patent: Dec. 10, 2019

(54) ROTOR AND METHOD FOR MANUFACTURING ROTOR

(71) Applicant: NHK Spring Co., Ltd., Yokohama-shi (JP)

(72) Inventors: Noriyoshi Kaneda, Kanagawa (JP); Shota Nishihama, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 209 days.

(21) Appl. No.: 15/117,291

(22) PCT Filed: Feb. 4, 2015

(86) PCT No.: PCT/JP2015/053153
§ 371 (c)(1),
(2) Date: Aug. 8, 2016

(87) PCT Pub. No.: WO2015/129421
PCT Pub. Date: Sep. 3, 2015

(65) Prior Publication Data
US 2016/0352200 A1 Dec. 1, 2016

(30) Foreign Application Priority Data
Feb. 28, 2014 (JP) .................................. 2014-039737

(51) Int. Cl.
*H02K 15/00* (2006.01)
*H02K 17/16* (2006.01)
(Continued)

(52) U.S. Cl.
CPC .......... *H02K 17/16* (2013.01); *B23K 20/122* (2013.01); *H02K 15/0012* (2013.01);
(Continued)

(58) Field of Classification Search
CPC ............. H02K 15/0012; H02K 17/16; H02K 2213/03; B23K 20/12; B23K 20/122; B23K 2201/36
(Continued)

(56) References Cited

U.S. PATENT DOCUMENTS 6,998,752 B2 * 2/2006 Yasuhara ........... H02K 15/0012
29/598
7,791,240 B2 * 9/2010 Alfermann ........... H02K 15/024
228/112.1
(Continued)

FOREIGN PATENT DOCUMENTS

DE 10258029 A1 7/2003
JP 2002-291211 A 10/2002
(Continued)

OTHER PUBLICATIONS

Supplementary Search Report dated Sep. 27, 2017, issued for the corresponding European application No. 15755284.5.
(Continued)

*Primary Examiner* — John K Kim
(74) *Attorney, Agent, or Firm* — Locke Lord LLP

(57) ABSTRACT

A rotor includes: conductors having a bar shape; a first end ring joined to one ends of the conductors by friction stir welding, at least a surface opposite to a surface from which the conductors extend being stirred by the friction stir welding; a second end ring joined to other ends of the conductors by friction stir welding, at least a surface opposite to a surface from which the conductors extend being stirred by the friction stir welding; and an iron core disposed between the first and the second end rings, having a cylindrical shape, and including a plurality of insertion holes through which the respective conductors are insertable in a central axis direction of the iron core.

2 Claims, 12 Drawing Sheets

(51) Int. Cl.
    *B23K 20/12*     (2006.01)
    *B23K 101/36*     (2006.01)

(52) U.S. Cl.
    CPC ........ H02K 17/165 (2013.01); *B23K 2101/36* (2018.08); *H02K 2213/03* (2013.01)

(58) Field of Classification Search
    USPC .......................................................... 310/211
    See application file for complete search history.

(56) References Cited

U.S. PATENT DOCUMENTS

| | | | |
|---|---|---|---|
| 8,181,333 | B2 | 5/2012 | Alfermann et al. |
| 2004/0113508 | A1* | 6/2004 | Yasuhara ........... H02K 15/0012 310/211 |
| 2009/0026877 | A1* | 1/2009 | Alfermann ........... H02K 15/024 310/261.1 |
| 2016/0352200 | A1* | 12/2016 | Kaneda .................. B23K 20/12 |

FOREIGN PATENT DOCUMENTS

| | | |
|---|---|---|
| JP | 2004-007949 A | 1/2004 |
| JP | 2004-236456 A | 8/2004 |
| JP | 2009-165215 A | 7/2009 |
| WO | 02/056446 A1 | 7/2002 |

OTHER PUBLICATIONS

International Search Report dated Mar. 24, 2015, issued for PCT/JP2015/053153.

Notification of Reason for Refusal dated Mar. 17, 2015, issued for the Japanese patent application No. 2014-039737 and English translation thereof.

Decision of Refusal dated Nov. 10, 2015, issued for the Japanese patent application No. 2014-039737 and English translation thereof.

* cited by examiner

ROTOR AND METHOD FOR MANUFACTURING ROTOR

FIELD

The present invention relates to a rotor and a method for manufacturing the rotor.

BACKGROUND

Induction motors have conventionally been known that include a stator that produces a rotating magnetic field and a rotor that is provided inside the stator and rotates in accordance with the rotating magnetic field. The induction motors are classified into two types depending on the types of alternate current to be supplied: single-phase induction motors; and three-phase induction motors. Of these induction motors, the three-phase induction motors have been widely used as general-purpose motors.

Such a three-phase induction motor includes a rotor formed of thick copper wires (bars) arranged in a cage shape. The rotor includes an iron core, a plurality of copper wires and end rings. The rotor is manufactured such that the copper wires are inserted into insertion holes of the iron core that is built with stacks of steel sheets, and both ends of each copper wire are fixed to the respective end rings (see Patent Literature 1, for example).

In Patent Literature 1, the copper wires are fixed to the end rings by friction stir welding. Friction stir welding is a joining process that can be performed with reduced cost compared to other joining processes such as brazing.

CITATION LIST

Patent Literature

Patent Literature 1: Japanese Patent No. 3730531

SUMMARY

Technical Problem

When the copper wires are joined to the end rings by friction stir welding as described in Patent Literature 1, the surrounding regions of the friction-stirred region only receives heat generated by friction. This heat might reduce the mechanical strength of the surrounding regions, which might lead to damage on the rotor.

In view of the foregoing, it is an object of the present invention to provide a rotor that can maintain strength when friction stir welding is performed in a joining process, and a method for manufacturing the rotor.

Solution to Problem

To solve the problem and achieve the object, a rotor according to the present invention includes: a plurality of conductors having a bar shape; a first end ring joined to one ends of the conductors by friction stir welding, at least a surface opposite to a surface from which the conductors extend being stirred by the friction stir welding; a second end ring joined to other ends of the conductors by friction stir welding, at least a surface opposite to a surface from which the conductors extend being stirred by the friction stir welding; and an iron core disposed between the first and the second end rings, having a cylindrical shape, and including a plurality of insertion holes through which the respective conductors are insertable in a central axis direction of the iron core.

Moreover, in the above-described rotor according to the present invention, the first and the second end rings are stirred by the friction stir welding.

Moreover, a method for manufacturing a rotor according to the present invention is a method for manufacturing a rotor including a plurality of conductors having a bar shape, a cylindrical iron core including a plurality of insertion holes through which the respective conductors are insertable, and first and second end rings that are joined to respective ends of the conductors. The method includes: a friction-stir-welding step of joining the conductors and a base by friction stir welding with end portions of the conductors housed in the base, such that the base includes the cylindrical iron core in a central axis direction of the iron core; and a forming step of forming the end rings by cutting the base such that at least a surface opposite to a surface from which the conductors extend, out of surfaces of the base that have been subjected to the friction-stir-welding step, becomes a surface stirred by the friction stir welding.

Moreover, in the above-described method for manufacturing a rotor according to the present invention, the friction-stir-welding step joins the base and the conductors the friction stir welding, the base being made of a material identical to a material of the conductors, after inserting the ends of the conductors into insertion holes formed in the base.

Moreover, in the above-described method for manufacturing a rotor according to the present invention, the friction-stir-welding step joins the base and the conductors the friction stir welding, the base being made of a material different from a material of the conductors, after fitting the ends of the conductors into recesses formed in the base.

Advantageous Effects of Invention

According to the present invention, strength can be maintained when friction stir welding is performed in a joining process.

DESCRIPTION OF EMBODIMENTS

Figure 1:
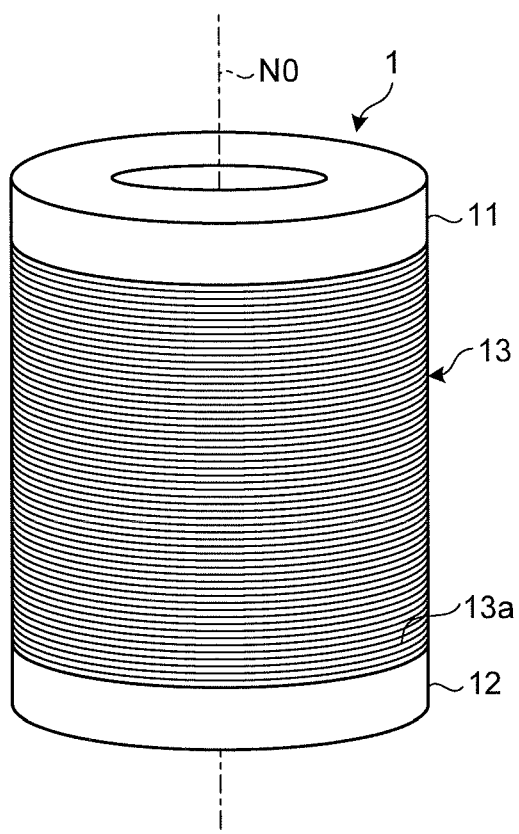
FIG. 1 is a perspective view illustrating a configuration of a rotor according to a first embodiment of the present invention.

The following describes embodiments of the present invention in detail with reference to the accompanying drawings. The embodiments described below are not intended to limit the scope of the present invention. The drawings referred to in the following description only schematically illustrate shapes, sizes, or positional relations of components to such an extent that the present invention can be understood. In other words, the present invention is not limited to the shapes, sizes, and positional relations illustrated in the drawings.

First Embodiment

Figure 2:
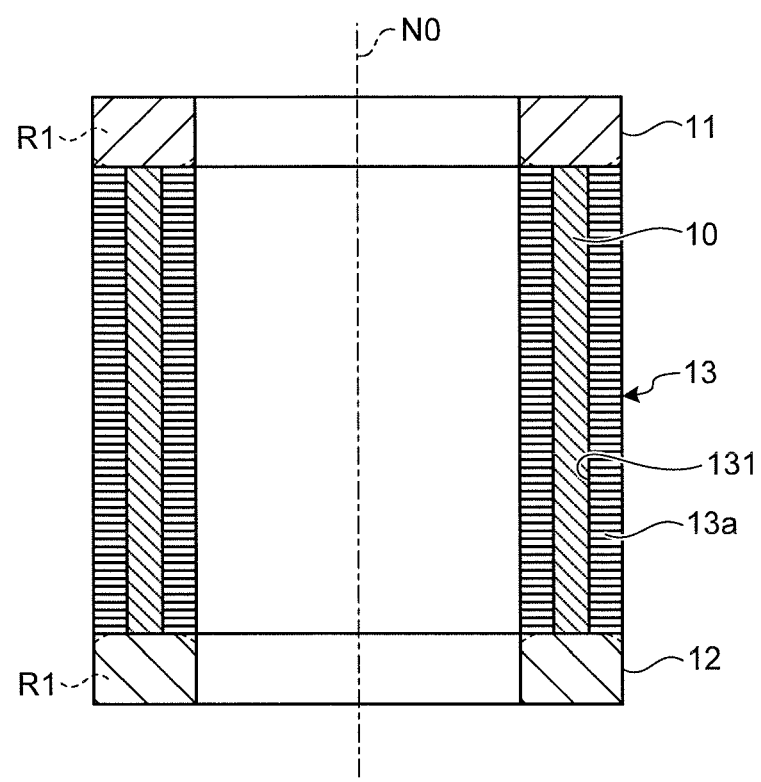
FIG. 2 is a cross-sectional view illustrating the configuration of the rotor according to the first embodiment of the present invention.

FIG. 1 is a perspective view illustrating a configuration of a rotor 1 according to a first embodiment of the present invention. FIG. 2 is a cross-sectional view illustrating the configuration of the rotor according to the first embodiment. The rotor 1 illustrated in FIGS. 1 and 2 is used for an induction motor, and is provided inside a stator and rotates in accordance with the rotating magnetic field of the stator.

The rotor 1 is a squirrel-cage rotor that includes thick copper wires (bars) arranged in a cage shape. The rotor 1 includes a plurality of bars (conductors) 10, end rings 11 and 12, and an iron core 13.

The bars 10 are made of, for example, copper or copper alloy and each have a shape of a prismatic column (bar). The number of bars 10 included in the rotor 1 depends on the configuration of the rotor 1. Although sixteen bars 10 are used for the rotor 1 in the description and drawings, the number of the bars 10 is not limited to this and may be any number depending on the design of the rotor 1. The bars 10 may have any shape as long as they have a bar shape such as a cylinder in addition to the prismatic column.

The end rings 11 and 12 are made of copper or copper alloy and each have a hollow cylinder shape. The end ring 11 (first end ring) is joined to one ends of the bars 10 by friction stir welding (a stir zone R1 in FIG. 2). The end ring 12 (second end ring) is joined to other ends of the bars 10 by friction stir welding.

The iron core 13 is built with, for example, stacks of electromagnetic steel sheets 13a. Each electromagnetic steel sheet 13a has a hollow disc shape and is made of a steel (such as silicon steel made by adding silicon to iron) having a high energy conversion efficiency from electric to magnetic energy. The electromagnetic steel sheet 13a has through holes through which the bars 10 are insertable in the through-thickness direction, the number of through holes depending on the number of the bars 10. The iron core 13, which is built with stacks of electromagnetic steel sheets 13a with the edges of the sheets all aligned, has a cylindrical shape, and has an insertion hole 131 formed by the through holes in communication with each other through which the bars 10 are inserted. The shape of the outer edge of the iron core 13 in a cross-sectional view taken perpendicularly to the central axis is not limited to circle, but may be an oval or a polygon.

The rotor 1 is manufactured such that the bars 10 are inserted into the insertion hole 131 of the iron core 13 built with stacks of electromagnetic steel sheets 13a, and the first and the second ends of the bars 10 are fixed to the end rings 11 and 12, respectively. The rotor 1 has a hollow portion into which a shaft of the induction motor will be inserted.

Figure 7:
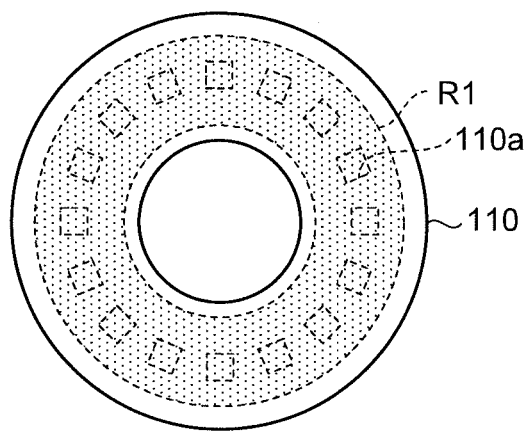
FIG. 7 is a plan view schematically illustrating the method for manufacturing the rotor according to the first embodiment of the present invention.
Figure 8:
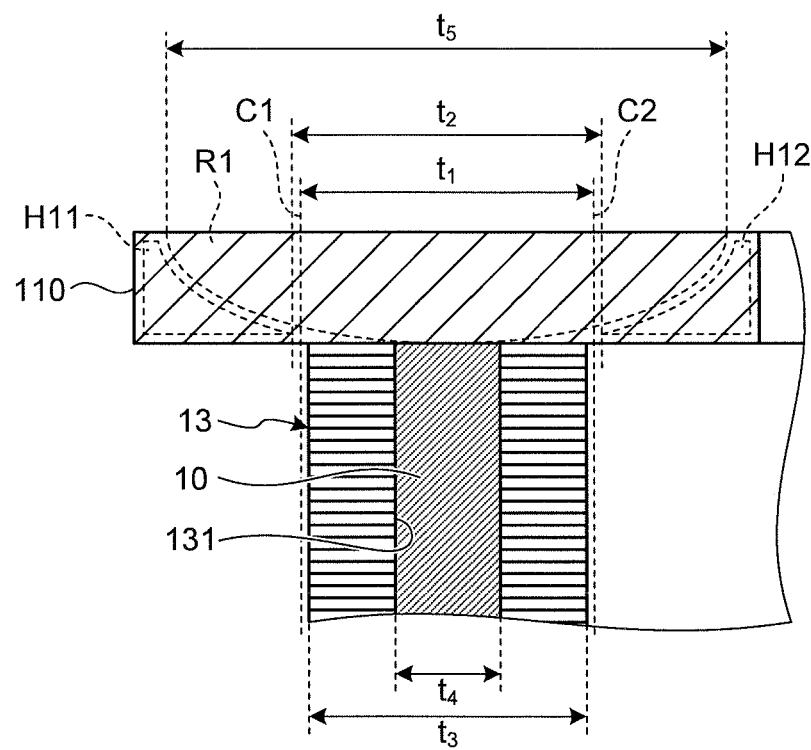
FIG. 8 is a cross-sectional view schematically illustrating the method for manufacturing the rotor according to the first embodiment of the present invention.
Figure 9:
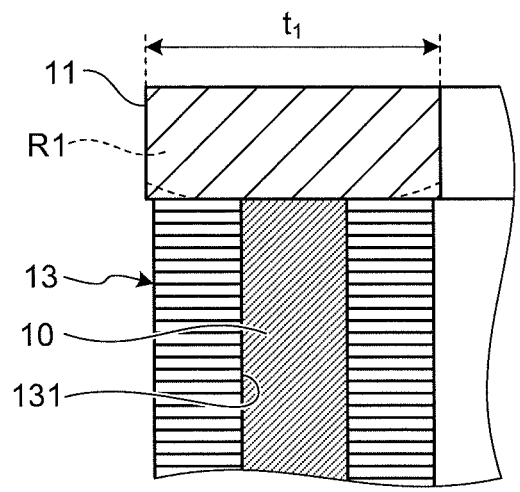
FIG. 9 is a cross-sectional view illustrating a configuration of main parts of the rotor according to the first embodiment of the present invention.

Described next is a method for manufacturing the rotor 1 with reference to FIGS. 3 to 9. FIGS. 3 to 6 are perspective views schematically illustrating the method for manufacturing the rotor according to the first embodiment. FIG. 7 is a plan view schematically illustrating the method for manufacturing the rotor according to the first embodiment. FIG. 8 is a cross-sectional view schematically illustrating the method for manufacturing the rotor according to the first embodiment. FIG. 9 is a cross-sectional view illustrating a configuration of main parts of the rotor according to the first embodiment. FIGS. 8 and 9 are partially sectional views taken along a plane including and parallel to a central axis N0 (longitudinal direction of the bars 10) of the rotor 1.

Figure 3:
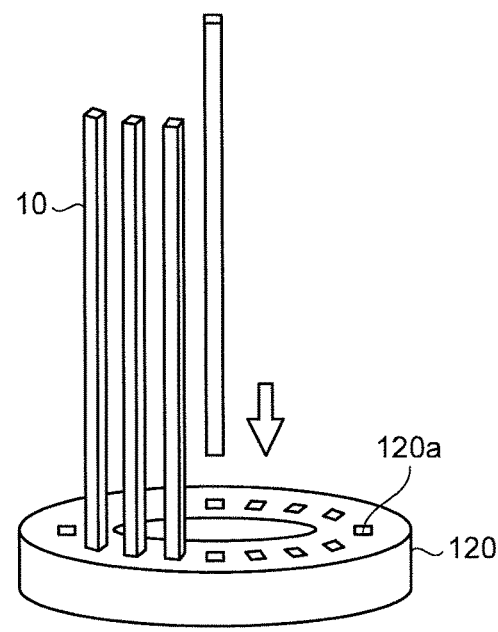
FIG. 3 is a perspective view schematically illustrating a method for manufacturing the rotor according to the first embodiment of the present invention.

First, one ends of the bars 10 are put into through holes 120a of a base 120 (see FIG. 3). The base 120, which will be formed into the end ring 12, is made of copper or copper alloy, and has a hollow cylinder shape. The base 120 has an outer diameter larger than that of the end ring 12, and has an inner diameter smaller than that of the end ring 12. With this process, the base 120 supports a plurality of bars 10 extending therefrom.

Figure 4:
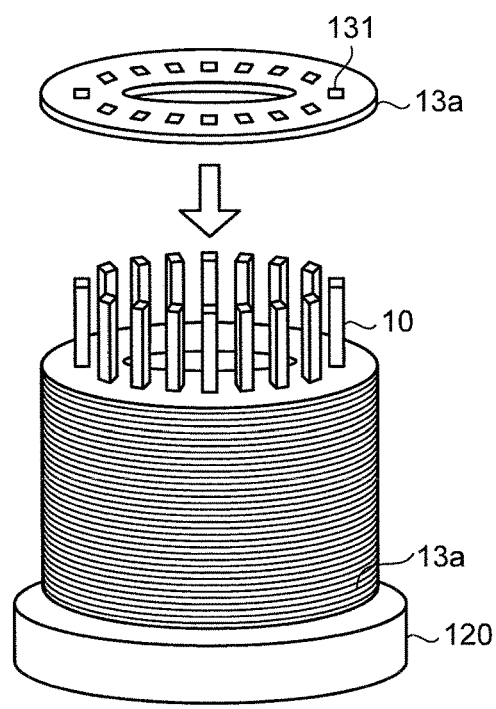
FIG. 4 is a perspective view schematically illustrating the method for manufacturing the rotor according to the first embodiment of the present invention.

Then, the electromagnetic steel sheets 13a are put on the base 120 one by one with the bars 10 extending from the base 120 inserted therethrough (see FIG. 4).

Figure 5:
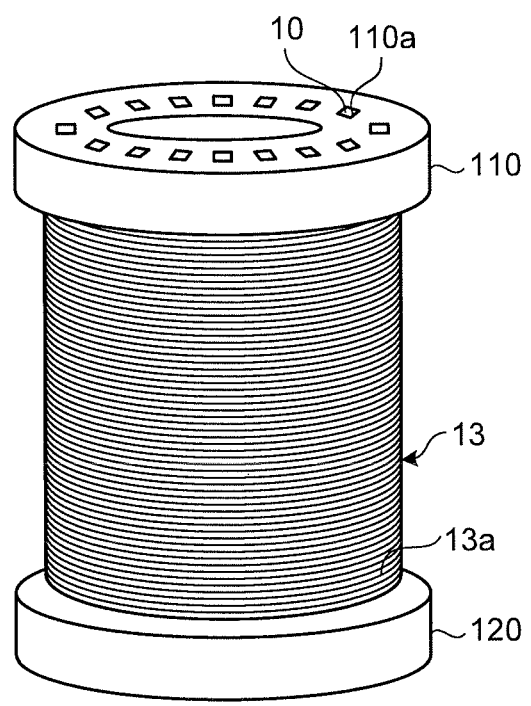
FIG. 5 is a perspective view schematically illustrating the method for manufacturing the rotor according to the first embodiment of the present invention.

Subsequently, other ends of the bars 10 extending from the iron core 13 (electromagnetic steel sheets 13a) are pushed into through holes 110a of a base 110 (see FIG. 5). The base 110, which will be formed into the end ring 11, is made of copper or copper alloy, and has a hollow cylinder shape. The base 110 has an outer diameter larger than that of the end ring 11, and has an inner diameter smaller than that of the end ring 11. The end surfaces of the first ends of the bars 10 that are pushed into the base 110 are flush with the top surface of the base 110, or a little recessed relative to the opening edges of the through holes 110a.

Figure 6:
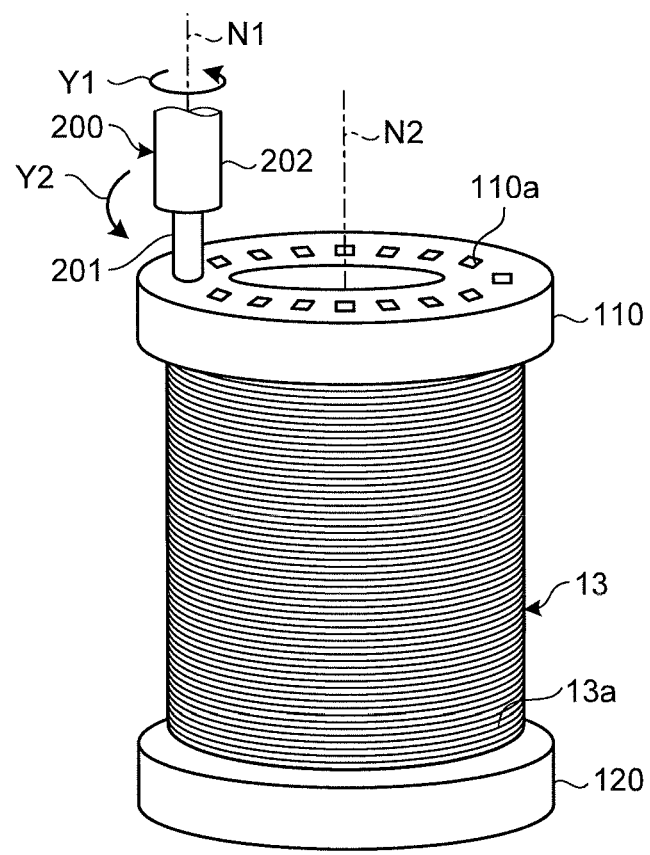
FIG. 6 is a perspective view schematically illustrating the method for manufacturing the rotor according to the first embodiment of the present invention.

Then, the base 110 and the bars 10 are joined by friction stir welding (see FIG. 6: friction-stir-welding step). In friction stir welding, a joining member 200 is used to join materials. The joining member 200 includes a shoulder 202 to which a probe 201 is coaxially attached at the shoulder's end. The probe 201 and the shoulder 202 both have a cylindrical shape, and the probe 201 has an outer diameter smaller than that of the shoulder 202. The shoulder 202 is rotatable around a central axis N1 (arrow Y1). When the shoulder 202 rotates, the probe 201 attached to the shoulder 202 rotates in tandem.

In friction stir welding, frictional heat is generated by the rotating shoulder 202 being rotated and plunged onto a surface of the base 110 opposite to the surface from which the bars 10 extend. This heat softens the base 110 and the bars 10, and the rotation of the shoulder 202 plasticizes and mixes the joining interfaces and the surroundings thereof. The plasticized and mixed materials are then solidified, thereby consolidating a part of the base 110 and end portions of the bars 10. With friction stir welding, the structure of the joined metal is refined, thereby achieving a high joining strength. Friction stir welding can join material such as copper at a lower temperature than the melting point of the material, and the residual stress and rate of deformation after joining are smaller than those that occur in fusion welding.

In friction stir welding, the rotating shoulder 202 turns (revolves: see the arrow Y2 in FIG. 6) around the central axis N2 of the base 110, thereby joining the bars 10 and the base 110. As illustrated in FIG. 7, the stir zone R1 on the surface of the base 110 that has been friction-stirred and joined along the movement of the shoulder 202 has an annular shape. The length (width) of the stir zone R1 in the radial direction (the radial direction of the base 110) is substantially equal to the outer diameter of the shoulder 202. In other words, the width of the stir zone R1 can be changed by changing the outer diameter of the shoulder 202. As illustrated in the cross-sectional view in FIG. 8, the boundary of the stir zone R1 in the base 110 has an arc shape.

In friction stir welding, peripheral regions of the friction-stirred region (stir zone R1) only receive heat generated by the friction. For example, in the peripheral regions of the stir zone R1, heat-affected zones H11 and H12 occur that have not been stirred but have only received the frictional heat (see FIG. 8). The heat-affected zones H11 and H12 each have an annular shape along the direction of the shoulder 202. The heat-affected zones H11 and H12 lower mechanical strength of these regions due to heat, which may lead to, for example, damage on the rotor 1. To prevent this situation, in the first embodiment, a part of the base 110 is cut off to remove the heat-affected zones H11 and H12 from the base 110.

Suppose that, in the radial direction of the base 110, $t_1$ represents a distance between cut positions C1 and C2 at which an outer edge portion and an inner edge portion of the base 110 are cut off, and $t_2$ represents the shortest distance between the heat-affected zones H11 and H12, $t_1$ and $t_2$ satisfy the relation $t_1 \leq t_2$. In the first embodiment, suppose that $t_3$ represents the radius (width) of the iron core 13 between the outer edge and the inner edge thereof, $t_4$ represents the diameter of a bar 10, and $t_5$ represents the width (diameter of the shoulder 202) of the stir zone R1 on the surface of the base 110, the radius $t_3$ of the iron core 13 is equal to or smaller than the distance $t_1$ between the cut positions ($t_3 \leq t_1$), and the diameter $t_4$ of the bar 10 is smaller than the width $t_5$ of the stir zone R1 ($t_4 < t_5$). In other words, the stir zone R1 includes the iron core 13 in the direction of the central axis N2 (central axis of the iron core 13) ($t_3 < t_5$).

The end ring 11 illustrated in FIG. 9 can be formed by cutting the base 110 at the cut positions C1 and C2 that satisfy the aforementioned relations (forming step). The end ring 11, which excludes the heat-affected zones H11 and H12, suppress the reduction in mechanical strength due to heat and maintains strength required for the end ring 11.

The end ring 12 can be formed by cutting the base 120 in the same manner as in the manufacturing process of the end ring 11 described above.

In the cut-off processing on the base 110 (and the base 120), the cut positions C1 and C2 may be determined such that the distance $t_1$ between the cut positions C1 and C2 is set to a value satisfying, for example, $t_1 \leq 0.7 \, t_5$ to cut off the outer and inner edge portions of the base 110.

In the cut-off processing on the base 110 (and the base 120), the base is not necessarily symmetrically cut relative to the central axis of the bar 10 in the cross-sectional view in FIG. 8 as long as the cut-off processing satisfies $t_1 \leq t_2$ and the resulting end ring 11 (end ring 12) excludes the heat-affected zones H11 and H12. As long as the base 110 and the bar 10 are stir-welded and the resulting end ring 11 after the cut-off processing excludes the heat-affected zones H11 and H12, the base 110 may be cut at any cut positions (in the cross-sectional view) and a part of the side surface of the iron core 13 may be cut off.

According to the first embodiment, the rotor 1 includes end rings (end rings 11 and 12) that exclude heat-affected zones (heat-affected zones H11 and H12) that occur in the joining process of the base 110 and the bars 10 using friction stir welding. This configuration can maintain the strength when the joining process is performed by friction stir welding.

Although, in the context of the first embodiment above, the entire end portions of the bars 10 inside the through holes 110a are subjected to friction stir welding, friction stir welding may be applied only to a part of the end portions of the bars 10 inside the through holes 110a. In other words, friction stir welding may be performed by using a joining member 200 including a probe 201 having a length from the shoulder 202 smaller than the thickness of the base 110.

First Modification of First Embodiment

Figure 10:
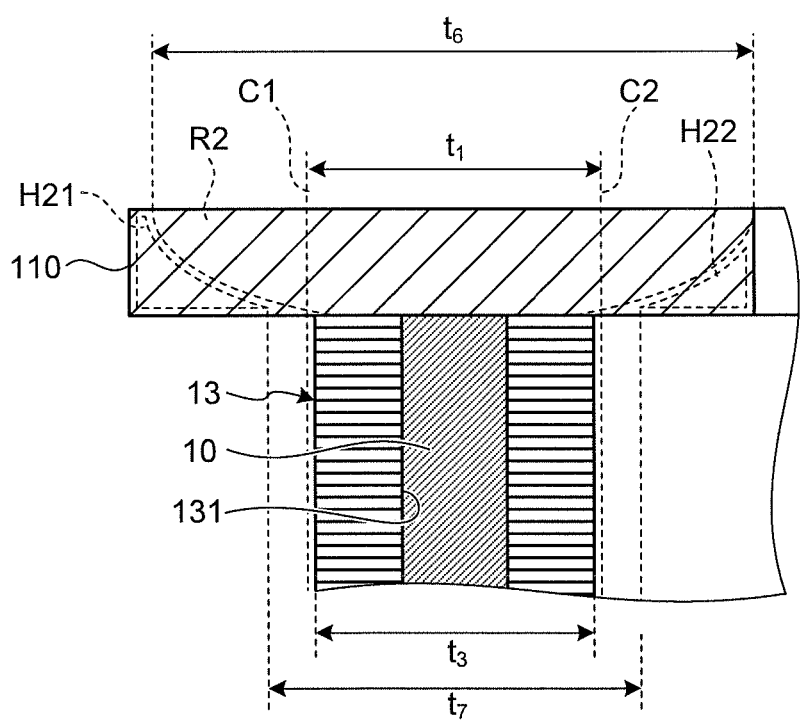
FIG. 10 is a diagram illustrating a method for manufacturing a rotor according to a first modification of the first embodiment of the present invention.
Figure 11:
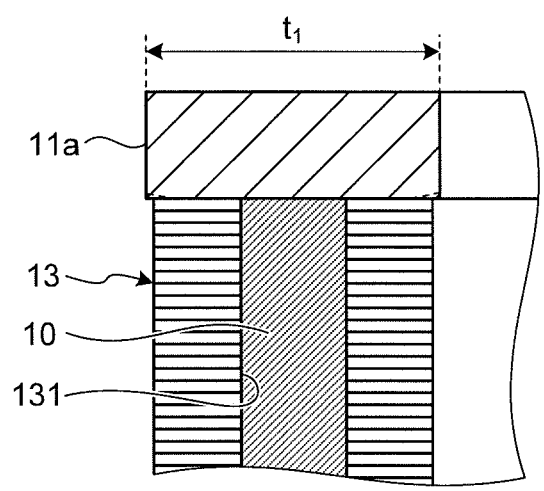
FIG. 11 is a cross-sectional view illustrating a configuration of main parts of the rotor according to the first modification of the first embodiment of the present invention.

FIG. 10 is a diagram illustrating a method for manufacturing a rotor according to a first modification of the first embodiment, and is a partially sectional view taken along a plane including and parallel to the central axis (longitudinal direction of the bars 10) of the rotor 1. FIG. 11 is a cross-sectional view illustrating a configuration of main parts of the rotor according to the first modification of the first embodiment. In the context of the first modification, an end ring 11a is composed only of a friction-stir-welded region.

The distance of the stir zone in the radial direction on the base can be increased by changing the diameter of the shoulder 202. As illustrated in the cross-sectional view in FIG. 10, the base 110 includes a stir zone R2 that has a larger width $t_6$ than the width $t_5$ on the surface of the base 110. The stir zone R2 covers the entire contact surface with the iron core 13. A shortest distance $t_7$ between heat-affected zones H21 and H22 that have occurred around the stir zone R2 is much larger than the distance $t_1$ between the cut positions C1 and C2. With this configuration, the resulting end ring 11a after the cut-off processing is composed only of the stir zone R2. This configuration can further maintain the strength of the end ring 11a.

Second Modification of First Embodiment

Figure 12:
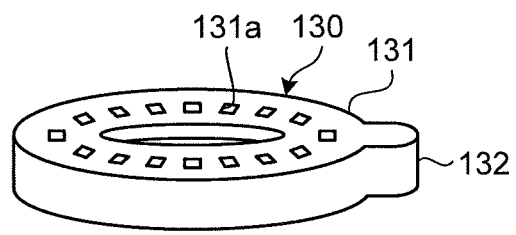
FIG. 12 is a perspective view illustrating a configuration of a main part of a rotor according to a second modification of the first embodiment of the present invention.
Figure 13:
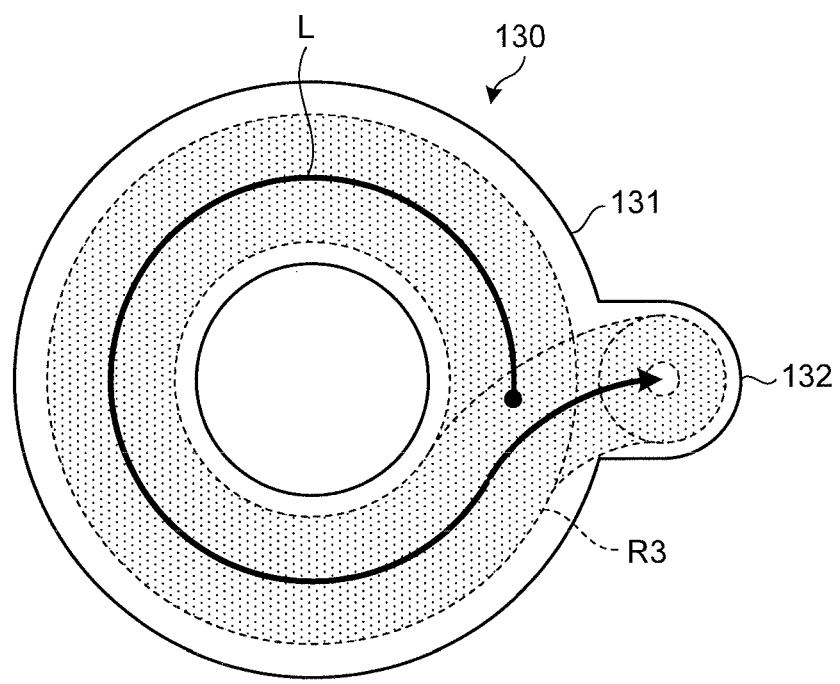
FIG. 13 is a diagram illustrating a method for manufacturing the rotor according to the second modification of the first embodiment of the present invention.

FIG. 12 is a perspective view illustrating a configuration of a main part of a rotor according to a second modification of the first embodiment. FIG. 13 is a diagram illustrating a method for manufacturing the rotor according to the second modification of the first embodiment. Friction stir welding sometimes leaves a mark of the probe 201 at the end of the trail in the stir process (stop position of the shoulder 202). Such a mark of the probe 201 may prevent the plasticized material from being homogeneously mixed, which may lead to reduction in joining strength.

As illustrated in FIG. 12, a base 130 according to the second modification has an annular ring portion 131 and an extension 132 provided at a part of the side surface of the ring portion 131 and extending therefrom in the radial direction of the ring portion 131. The ring portion 131 has through holes 131a through which the bars 10 are inserted. The extension 132 extends such that lengths in the radial direction and the width direction (a direction orthogonal to the radial direction on the surface) are equal to or larger than the diameter of the shoulder 202.

As illustrated in FIG. 13, to join the base 130 and the bars 10, the shoulder 202 moves along the entire circumference of the ring portion 131 and then reaches the extension 132. A trail L indicates a path of the central axis of the probe 201 drawn in accordance with the movement of the shoulder 202. The shoulder 202 moves to draw the trail L, thereby forming a stir zone R3. With this configuration, the mark of the probe 201 at the end of the trail (stop position of the shoulder 202) in the stir process is left at a position away from the ring portion 131, which can prevent the mark of the probe 201 from being left on the resulting end ring.

In the second modification, no mark of the probe 201 is left on the resulting end ring, which can prevent reduction in joining strength that is caused by the mark of the probe 201 that prevents the plasticized material from being homogeneously mixed. This configuration can still further maintain the strength when friction stir welding is performed in the joining process.

Third Modification of First Embodiment

Figure 14:
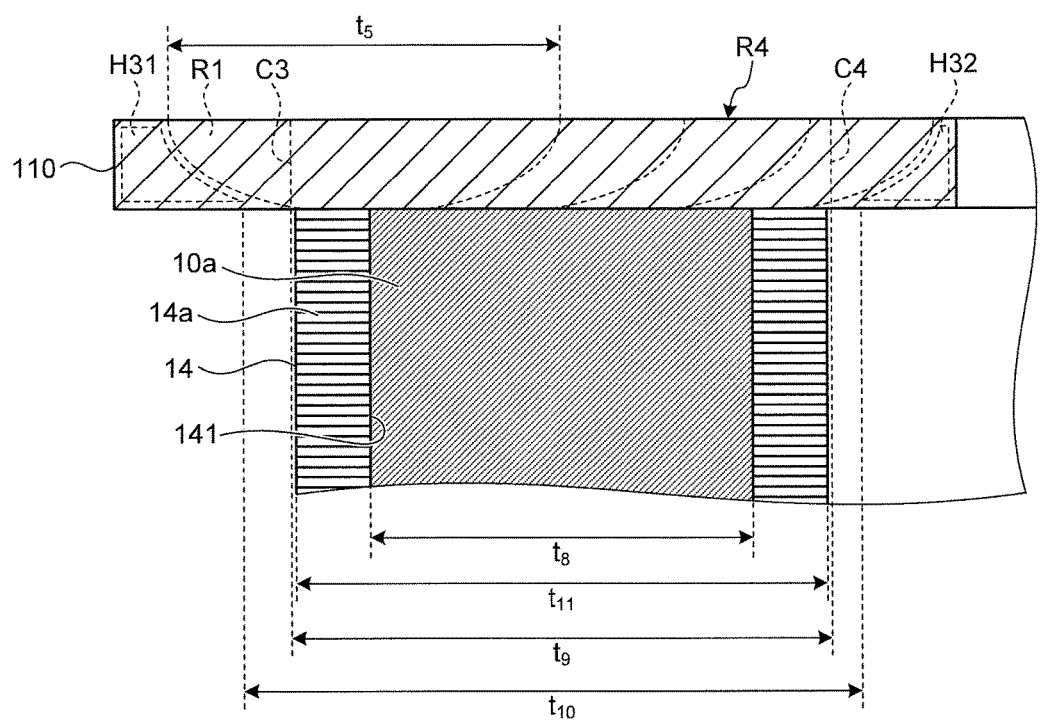
FIG. 14 is a cross-sectional view illustrating a configuration of main parts of a rotor according to a third modification of the first embodiment of the present invention.

FIG. 14 is a cross-sectional view illustrating a configuration of main parts of a rotor according to a third modification of the first embodiment. In the first embodiment described above, the bars 10 have the diameter $t_4$ smaller than the diameter of the shoulder 202 (that is, the width $t_5$ of the stir zone R1 on the surface of the base 110). In the third modification, bars 10a have a diameter $t_8$ larger than the diameter (width $t_5$) of the shoulder 202.

The rotor according to the third modification includes the bars 10a having a diameter (diameter $t_8$) larger than the diameter (width $t_5$) of the shoulder 202 instead of the bars 10, and a cylindrical iron core 14 having openings 141 through which the bars 10a are insertable instead of the iron core 13. The iron core 14 is built with stacks of electromagnetic steel sheets 14a.

As illustrated in FIG. 14, when the diameter $t_8$ of the bars 10a is larger than the diameter (width $t_5$) of the shoulder 202, the shoulder 202 moves in a circular path on the surface of the base 110 while moving in the radial direction of the base 110 to form a stir zone R4. Suppose that, in the radial direction of the base 110, $t_8$ ($>t_5$) represents the diameter of the bars 10a, $t_9$ represents the distance between cut positions C3 and C4 at which an outer edge portion and an inner edge portion of the base 110 are cut off, and $t_{10}$ represents the shortest distance between heat-affected zones H31 and H32, $t_9$ and $t_{10}$ satisfy the relation $t_9 \le t_{10}$. In the third modification, suppose that $t_{11}$ represents the radius of the iron core 14 between the outer edge and the inner edge thereof, the radius $t_{11}$ of the iron core 14 is equal to or smaller than the distance $t_9$ between the cut positions ($t_{11} \le t_9$).

According to the third modification, an end ring excluding heat-affected zones (heat-affected zones H31 and H32) can be formed when the bars 10a have the diameter $t_8$ larger than the diameter (width $t_5$) of the shoulder 202.

Second Embodiment

Figure 15:
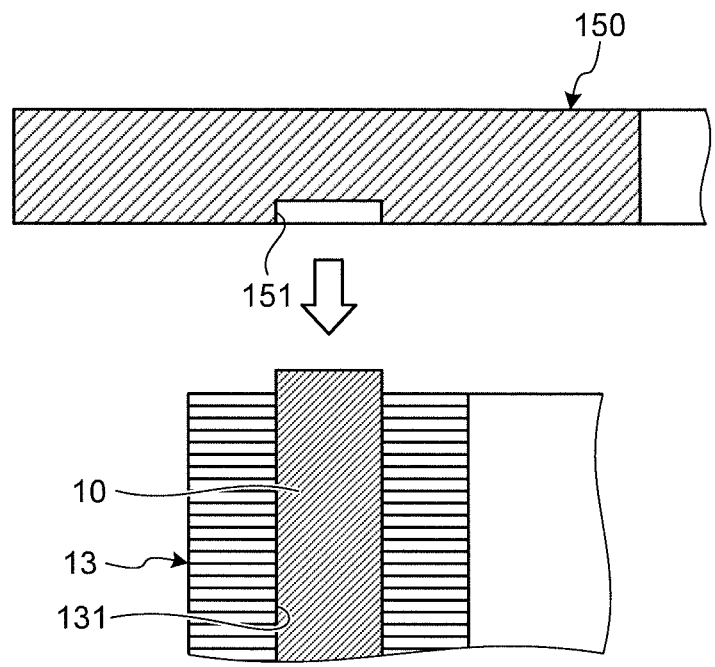
FIG. 15 is a cross-sectional view schematically illustrating a method for manufacturing a rotor according to a second embodiment of the present invention.
Figure 16:
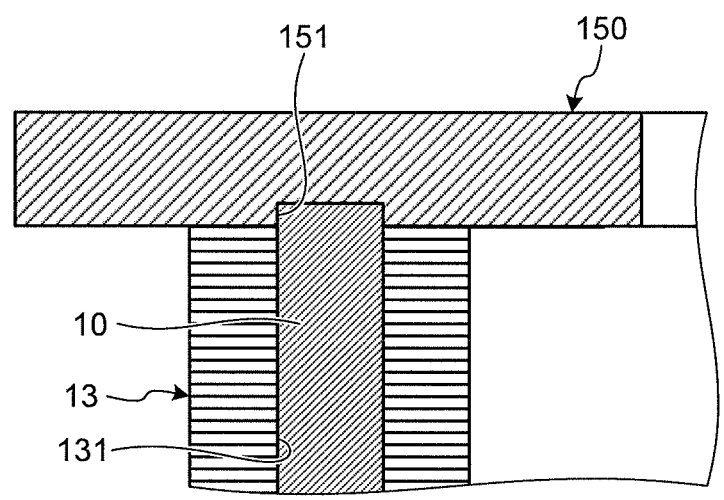
FIG. 16 is a cross-sectional view schematically illustrating the method for manufacturing the rotor according to the second embodiment of the present invention.
Figure 17:
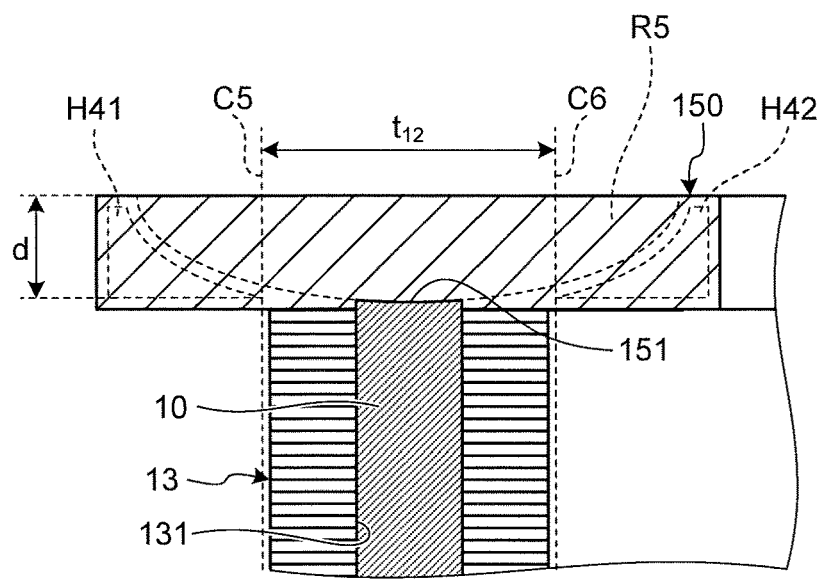
FIG. 17 is a cross-sectional view schematically illustrating the method for manufacturing the rotor according to the second embodiment of the present invention.
Figure 18:
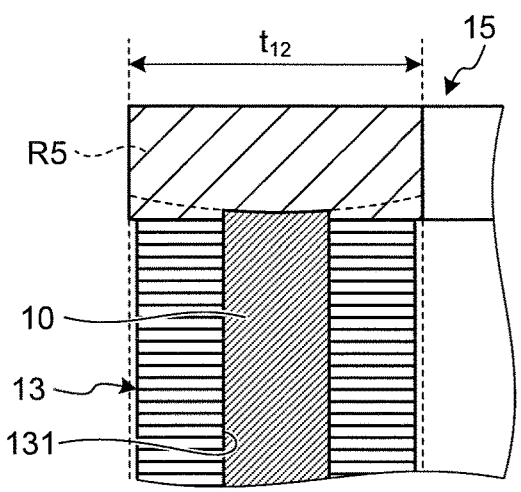
FIG. 18 is a cross-sectional view illustrating a configuration of main parts of the rotor according to the second embodiment of the present invention.

Described next is a second embodiment of the present invention. FIGS. 15 to 17 are cross-sectional views schematically illustrating a method for manufacturing a rotor according to the second embodiment of the present invention. FIG. 18 is a cross-sectional view illustrating a configuration of main parts of the rotor according to the second embodiment of the present invention. FIGS. 15 to 18 are cross-sectional views taken along a plane including and parallel to the central axis (longitudinal direction of the bars 10) of the rotor 1. The same constituent elements as those illustrated in, for example, FIG. 1 are given the same reference signs.

The rotor according to the second embodiment includes an end ring formed from a base 150 made of, unlike the bars 10, a material softer than copper such as aluminum, iron, titan, or magnesium, or an alloy mainly containing one of those materials.

The base 150 has a plate shape and has a plurality of recesses 151 on a surface. The recesses 151 are provided in accordance with the number of the bars 10 and joining positions of the bars 10.

As illustrated in FIGS. 15 and 16, before the base 150 and the bars 10 are joined, the end portions of the bars 10 are fitted into the respective recesses 151. This process determines the positions of the bars 10 relative to the base 150.

Subsequently, the base 150 and the bars 10 are stir-welded by friction stir welding (see FIG. 17). In this case, the length of the probe 201 projecting from the shoulder 202 is set to a length equivalent to a thickness d from the bottom of a recess 151 to the top surface of the base 150. This configuration causes the base 150 to be plasticized and mixed by friction stirring, and the bars 10 to be friction-stirred only on the end portions thereof, and the base 150 and the bars 10 are thus joined in the second embodiment.

After friction stir welding, cut positions C5 and C6 and a distance $t_{12}$ therebetween are determined in accordance with heat-affected zones H41 and H42 that have occurred around a stir zone R5, and the base 150 is cut, accordingly. With these processes, different materials can be joined by friction stir welding, and an end ring 15 excluding the heat-affected zones H41 and H42 can be formed.

According to the second embodiment above, the end ring 15 is formed that excludes heat-affected zones (heat-affected zones H41 and H42) that occur in friction stir welding performed on the base 150 and the bars 10 that are made of different materials. This configuration can maintain strength when different materials are joined by friction stir welding.

In the second embodiment, both end rings of the rotor may be formed from the base 150, or an end ring may be formed from the base 150 and the other end ring may be formed from the base 110 (or the base 130). When the diameter of the bars 10 is larger than the diameter (width) of the shoulder 202 as described in the third modification of the first embodiment, the stir zone may be formed by moving the shoulder in the radial direction. Combinations of the first embodiment (including the first to third modifications thereof) and the second embodiment may be optionally selected depending on the specifications of the rotor to be used.

Although, in the context of the first and the second embodiments above, the top surface and a part of the side surface of the resulting end ring include a friction-stirred region (stir zone), the embodiments are not limited to this as long as the base and the bars are stir-welded, and the resulting end ring after cutting excludes any heat-affected zone. For example, when the boundary of the stir zone in a cross-sectional view of the end ring has a substantially semi-circular shape having an average radius of curvature smaller than that of the semi-circular stir zone illustrated in FIG. 8, at least the top surface (opposite to the surface at which the bars are joined) of the surfaces of the end ring needs to be composed of a plasticized region caused by friction stir welding.

Although, in the context of the first and the second embodiments above, the cut positions are symmetrically determined based on the center of the friction-stirred region (stir zone), the center between the cut positions may deviate from the center of the stir zone as long as the base and the bars are stir-welded and the resulting end ring after cutting excludes any heat-affected zone.

The first and the second embodiments above are presented for illustrative purpose only to implement the present invention, and the present invention is not limited to these. The present invention can be embodied in various other forms by optionally combining the constituent elements disclosed in the first and the second embodiments and the modifications. It is apparent that various modifications may be made depending on, for example, specifications, and variant embodiments can be brought to the invention without departing from the scope of the invention.

INDUSTRIAL APPLICABILITY

As described above, the rotor and the method for manufacturing the rotor according to the present invention have advantage in maintaining strength when friction stir welding is performed in a joining process.

REFERENCE SIGNS LIST

1 Rotor
10, 10a Bar
11, 11a, 12, 15 End ring
13, 14 Iron core
13a, 14a Electromagnetic steel sheet
110, 120, 130, 150 Base
110a, 120a, 131a Through hole
151 Recess

The invention claimed is:
1. A rotor comprising:
a plurality of conductors having a bar shape;
a first end ring joined to one ends of the conductors, wherein an entire surface of the first end ring that is opposite to a surface from which the conductors extend, a part of an outer side surface of the first end ring and a part of an inner side surface of the first end ring include a portion including a mixture of materials of the first end ring and the conductors, and
a part of the first end ring and the one ends of the conductors are consolidated and are exposed on the entire surface of the first end ring, on the part of the outer side surface of the first end ring and on the part of the inner side surface of the first end ring;
a second end ring joined to other ends of the conductors, wherein
an entire surface of the second end ring that is opposite to a surface from which the conductors extend, a part of an outer side surface of the second end ring and a part of an inner side surface of the second end ring include a portion including a mixture of materials of the second end ring and the conductors, and
a part of the second end ring and the other ends of the conductors are consolidated and are exposed on the entire surface of the second end ring, on the part of the outer side surface of the second end ring and on the part of the inner side surface of the second end ring; and
an iron core disposed between the first and the second end rings, having a cylindrical shape, and including a plurality of insertion holes through which the respective conductors are insertable in a central axis direction of the iron core.

2. The rotor according to claim 1, wherein the first end ring and one ends of the conductors are joined by a friction stir welding, and the second end ring and other ends of the conductors are joined by a friction stir welding.

* * * * *